June 24, 1952   D. J. GAFFNEY   2,601,511
PNEUMATICALLY OPERATED DIAPHRAGM MOTOR
Filed Aug. 17, 1948   3 Sheets-Sheet 1
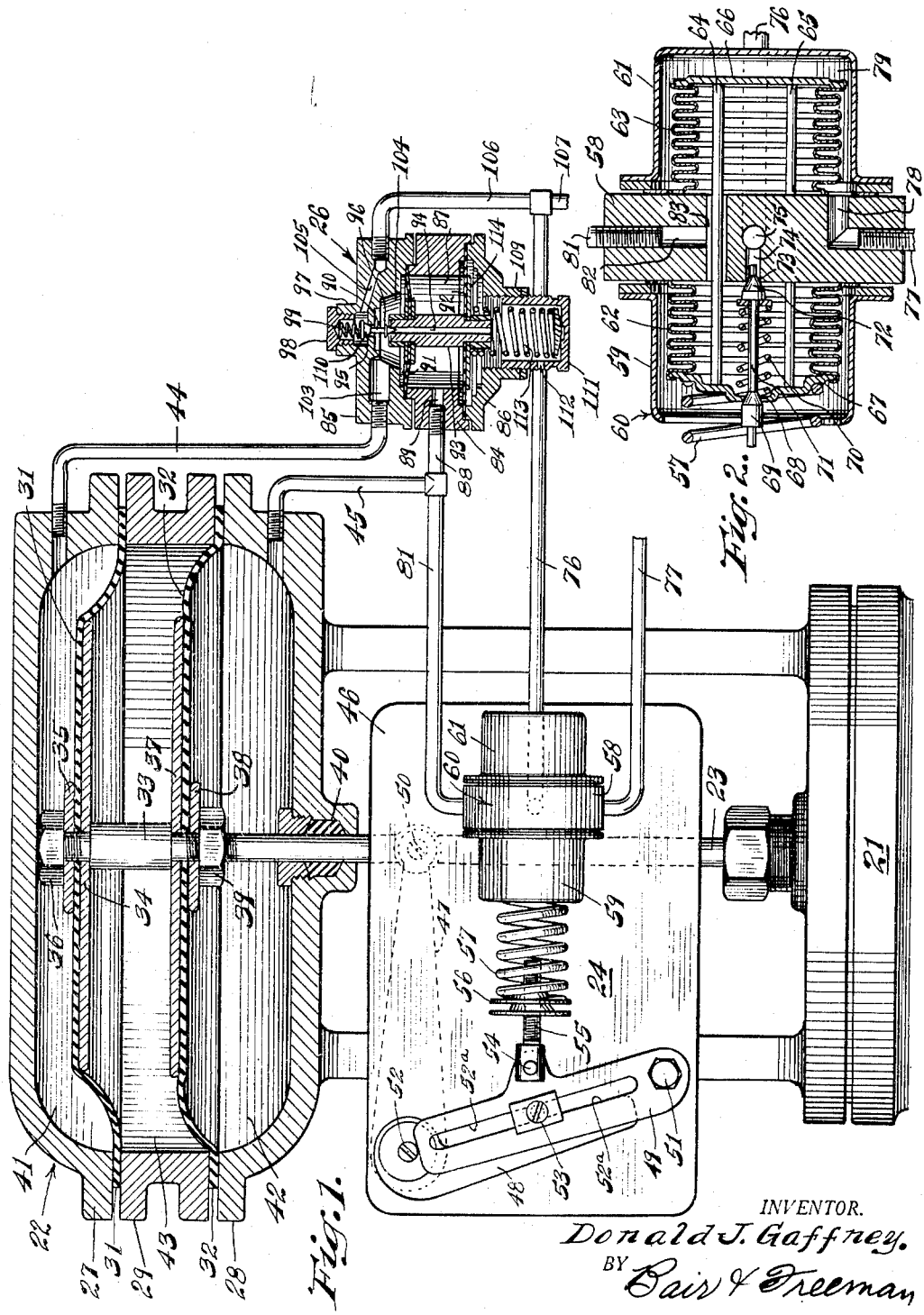
INVENTOR.
Donald J. Gaffney.
BY Bair & Freeman
Attys.

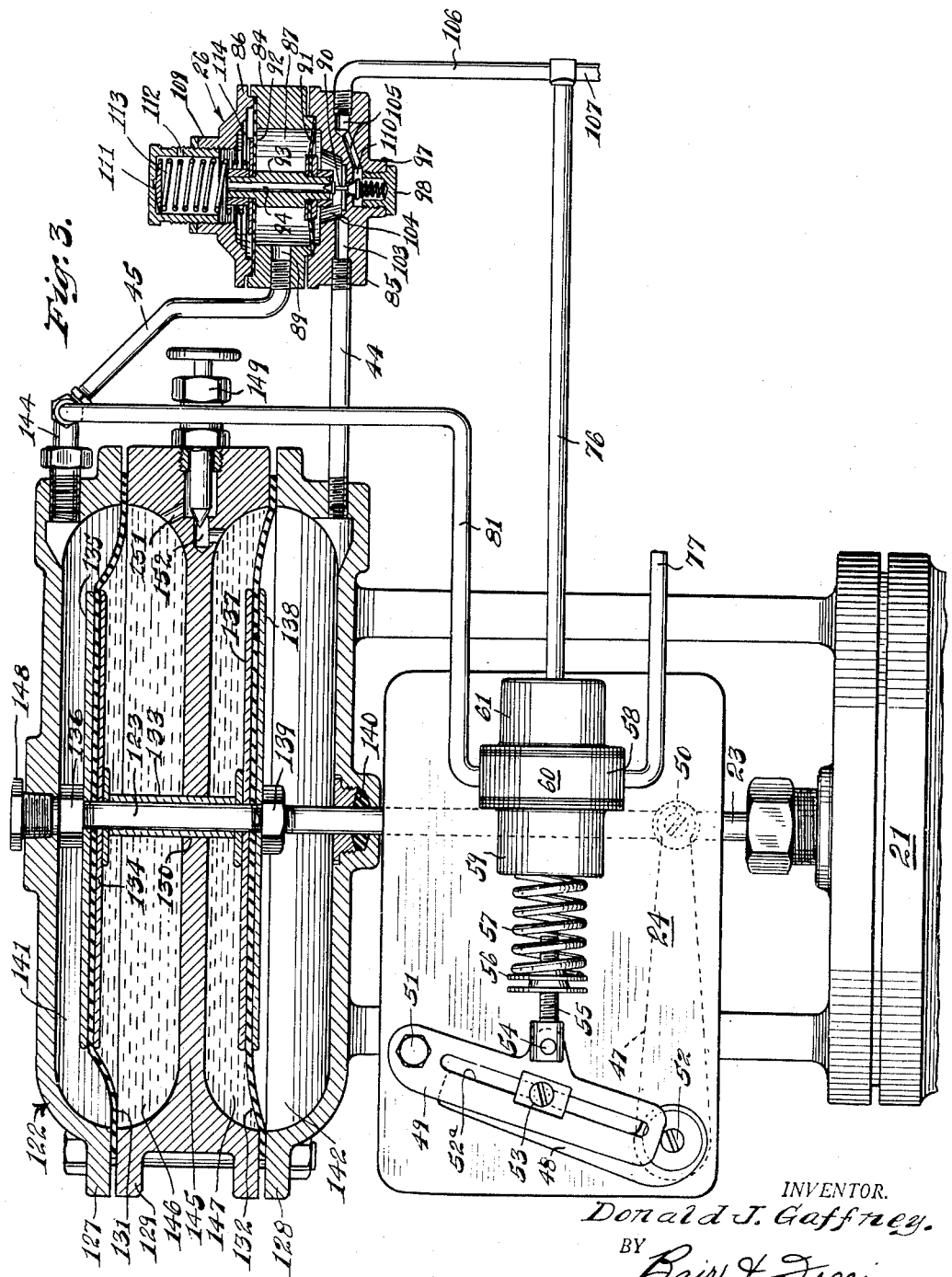

June 24, 1952 D. J. GAFFNEY 2,601,511
PNEUMATICALLY OPERATED DIAPHRAGM MOTOR
Filed Aug. 17, 1948 3 Sheets-Sheet 3

Inventor:
Donald J. Gaffney
By Beir & Freeman
Att'ys.

Patented June 24, 1952

2,601,511

UNITED STATES PATENT OFFICE 2,601,511

PNEUMATICALLY OPERATED DIAPHRAGM MOTOR

Donald J. Gaffney, Marshalltown, Iowa, assignor to Fisher Governor Company, Marshalltown, Iowa, a corporation of Iowa Application August 17, 1948, Serial No. 44,780

7 Claims. (Cl. 121—48)

This invention relates to a diaphragm operated motor and particularly to such a motor for transmitting straight line motion to open and close a valve, governor, or the like.

In the conventional spring loaded diaphragm motor, equipped with a valve device sometimes referred to in this art as a positioner, the force available for downward thrust on the valve or governor stem is the pounds per square inch (hereinafter referred to as p. s. i.) output from the positioner, which is normally 20 p. s. i., times the area of the diaphragm, minus the compression rate of the spring times the number of inches it is compressed. In commercial practice, about 75% of the pressure from the positioner is absorbed by the spring at the end of the stroke, and only 25% is available for stem thrust. The only force available for upward thrust at the beginning of the downward stroke is the initial compression of the spring, which never amounts to more than 5 p. s. i. equivalent diaphragm pressure in commercial practice.

The available power in spring loaded diaphragm motors has proven inadequate to handle large single seated controllers, butterfly valves and even large semi-balanced control valves with extensive pressure drops. Consequently, there is a definite need for a diaphragm motor with more power.

One attempted solution to the problem has been a single diaphragm motor which is air loaded on top of the diaphragm by a valve device, and loaded on the bottom with a constant air supply set by a small regulator. The regulator is set at a pressure equal to one-half the maximum output of the valve device and thus has a differential pressure available which is equal to one-half the supply pressure to the valve device. If the valve device supply pressure is 20 p. s. i., the regulated pressure on the bottom of the diaphragm is set at 10 p. s. i. If the valve device pressure goes to zero, 10 p. s. i. is available for upward force, and if the valve device output goes to 20 p. s. i., there is 10 p. s. i. available for downward force.

It has been found, however, that such a motor is not sufficiently powerful for all purposes. Furthermore, a single diaphragm has a certain amount of slack flopping back and forth with equal pressures on both of its sides. This allows diaphragm head movement resulting in displacement equivalent to the volume in the diaphragm slack without compressing the air in one side of the casing. It is desirable, however, to have the diaphragm movement resisted at all times by the compressibility of the air.

It is an object of the invention to provide a powerful pneumatically operated diaphragm motor.

It is also an object of the invention to provide such a diaphragm motor in which diaphragm movement is resisted at all times and in which there is no slack.

It is a further object of the invention to provide a powerful pneumatic double diphragm motor.

It is another object of the invention to provide a double diaphragm motor in combination with a pneumatic reversing valve means or relay; also to provide such a combination for use with a valve device which admits or exhausts pressure fluid from one side of the motor and also operates the reversing valve.

Another object of the invention is to provide a system wherein the direction of motion of the pneumatic motor may be reversed by a simple change in piping connections.

With these and other objects in view, the invention consists in the construction, arrangement and combination of the various parts of my device whereby the objects contemplated are attained, as hereinafter more fully set forth, pointed out in the claims and illustrated in the accompanying drawings, wherein:

Figure 1 is an elevational view with parts thereof in section, of one embodiment of the invention;

Figure 2 is a section view of a portion of the valve device shown in Figure 1;

Figure 3 is an elevational view, partially in section, of a second embodiment of the invention wtih the pneumatic valve means and valve device shown in an inverted position from that shown in Figure 1.

Figure 4:
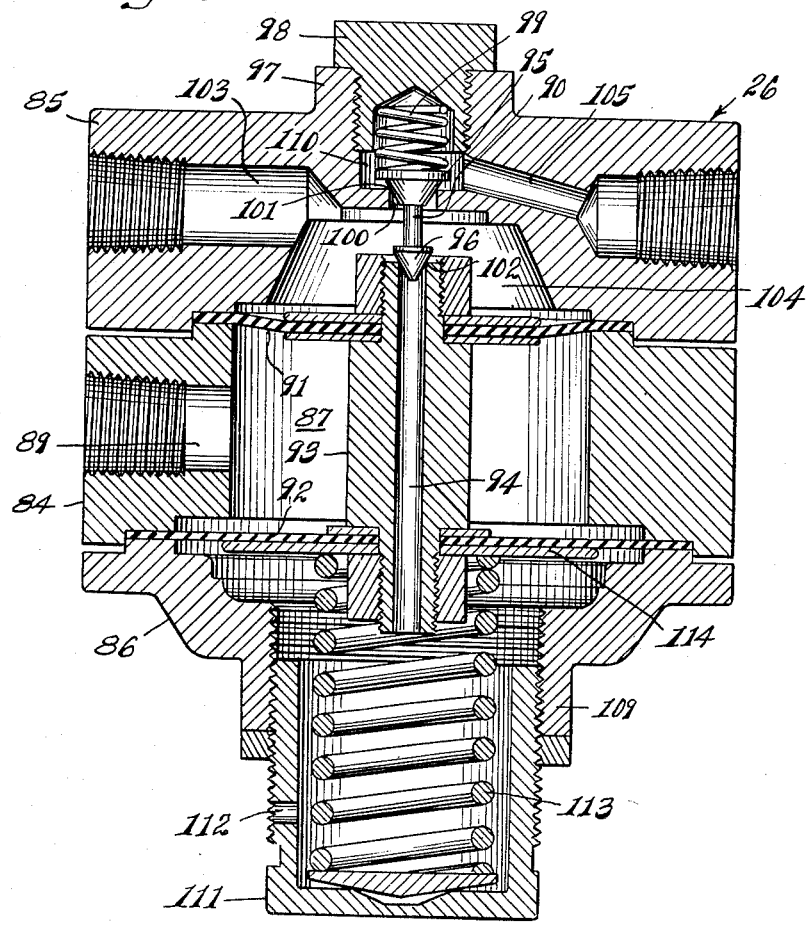
Figure 4 is an enlarged sectional view of the reversing relay.

Referring specifically to the drawings, particularly Figures 1 and 2, for a detailed description of the first embodiment of the invention, a valve body is indicated generally at 21 and may be any conventional control valve, butterfly valve, turbine governor control, or the like, well known in the art. A mechanism for operating the valve or governor includes a double diaphragm assembly generally indicated at 22, operating a reciprocating stem 23, a conventional valve device 24 and a reversing valve means 26 being connected to each other and to the double diaphragm assembly by suitable piping to be described. The reversing valve means per se is disclosed and claimed in the copending application of Cecil M. Johnson, Serial No. 44,662, filed August 27, 1948, for Pneumatic Reversing Relays.

The double diaphragm assembly 22 comprises an upper cup-shaped casing member 27, a lower cup-shaped casing member 28 and an intermediate annular or ring shaped member 29. An upper diaphragm 31, formed of rubber or synthetic rubber-like material, is clamped between the casing members 27 and 29, and a lower rubber or synthetic rubber diaphragm 32 is clamped between the casing members 28 and 29. Bolts (not shown) are provided for retaining the casing members together.

The valve stem 23 is provided with an enlarged portion 33, which is disposed within the double diaphragm member 22. The enlarged portion 33 of stem 23 engages with a plate 34 disposed on the underside of the diaphragm 31. A plate 35 engages with the upper surface of the diaphragm 31 and is clamped to the plate 34 with the diaphragm 31 therebetween by a nut 36.

A plate 37 is disposed beneath the enlarged portion 33 in contact with the upper surface of the diaphragm 32. A plate 38 clamps the diaphragm 32 between itself and the plate 37 by means of a nut 39 secured to stem 23. Movement of either diaphragm is, therefore, transmitted to the other without slack. Atmospheric pressure is present between the diaphragms 31 and 32.

The stem 23 extends through the lower casing member 28 and into the casing 21, a packing gland 40 being provided in the lower casing portion 28 for the stem 23.

The diaphragms 31 and 32 divide the double diaphragm 22 into an upper chamber 41, a lower chamber 42 and an intermediate chamber 43. A conduit or pipe 44 communicates with the upper chamber 41, and a conduit 45 communicates with the lower chamber 42, for a purpose hereinafter described.

A valve plate 46 supports levers 47, 48 and 49. The lever 47 is pivotally connected to valve stem 23 at 50. The levers 47 and 48 are connected together and are pivotally supported on the plate 46 at 52. The lever 49 is pivotally connected to the plate 46 at 51 and is provided with a longitudinal slot 52a. The lever 48 is also pivotally connected to a block 53 which slides in slot 52a, so that vertical movement of the stem 23 rotates lever 49 about its pivot 51. A threaded member 55 is pivotally connected to the lever 49 at 54 and has a threaded abutment member 56 thereon which engages with a spring 57, and is adjustable to vary the compression thereof.

A combination bellows and valve member, generally indicated at 60, is illustrated in detail in Figure 2 and comprises a main body portion 58 having an open ended casing 59 secured to one side thereof adjacent spring 57, and a closed cup-shaped member 61 secured to the other side thereof. A bellows 62 is secured to the side of the main body portion 58 facing the spring 57, and a bellows 63 is secured to the other side of the main body portion 58 and is contained within the casing 61. Rods 64 and 65 extend through openings 83 in the body portion 58 and engage a plate 66 secured to bellows 63, and plate 67 secured to bellows 62. Spring 57 also engages the outside of plate 67 and tends to collapse bellows 62.

The plate 67 is provided with a central opening 68 therein, which provides a seat for a valve member 69, which is a part of a valve assembly 71, which in turn has a second valve member 72 on its inner extremity. A spring 70 engages the inner valve member 72 and the plate 67 tends to maintain the valve member 72 seated on its seat 73 formed in body member 58. A pair of passages 74 and 75 are also provided in body member 58 in communication with a conduit 76. The valve member 72 operates to open and close passages 74 and 75, which communicate with conduit 76, in a manner hereinafter described. A conduit 77, which communicates with a standard instrument or controller (not shown), also communicates with a passage 78 in body 58, which passage 78 opens into a chamber 79 formed between casing member 61 and bellows 63. Chamber 79 is, obviously, hermetically sealed.

Another conduit 81, which communicates with conduit 45 and lower chamber 42 of the double diaphragm member 22, also communicates with a passage 82 in body 58, which in turn communicates with passages 83 in body 58 through which rods 64 and 65 extend. Conduit 81 is, therefore, in communication with the interior of the bellows 62 and 63.

The reversing valve means 26 comprises a central body portion 84, to which is secured an upper body portion 85 and a lower body portion 86. A chamber 87 is formed in the central body portion 84 of reversing valve means 26, and a conduit 88 communicates with the chamber 87 through a bore 89 at one end thereof and with conduits 45 and 81 at the other end thereof.

A diaphragm 91 formed of rubber or synthetic rubber is clamped between the upper portion 85 and the central portion 84 of the reversing valve means, and the diaphragm 92 is clamped between the lower portion 86 and the central portion 84 of the reversing valve means. Bolts may be utilized for retaining the parts together. The effective area of the lower diaphragm 92 is approximately twice that of the upper diaphragm 91. A stem 93 is secured to the upper and lower diaphragms 91 and 92, in any suitable manner, the stem 93 being provided with a central passage 94 extending therethrough. A valve assembly 90 has an upper valve member 95 and a lower valve member 96. The lower valve member 96 normally closes the upper end of passage 94. The upper body portion 85 of relay 26 is provided with a boss 97, which is internally screw threaded to receive a plug 98. A spring 99 engages with the plug 98 and with the upper valve member 95 to normally bias the valve member 95 into engagement with its seat 101 surrounding a passage 100 in body portion 85, as best shown in Figure 4. The spring 99 also biases the valve member 96 into engagement with its seat 102 on top of stem 93, as shown in Figure 4.

A passage 103 is provided in the upper body portion 85 of reversing valve means 26 and communicates at one end with pipe 44, which in turn is in communication with upper chamber 41 of the double diaphragm member 22. The other end of passage 103 communicates with a chamber 104, which is formed above diaphragm 91. A second passage 105 is provided in the upper portion 85 of reversing valve means 26, which communicates at one end with a conduit 106, and at its other end with a chamber 110 above valve member 95. The conduit 106 also communicates with conduit 76 and with a conduit 107, which latter conduit connects with a regulated air supply.

The lower body portion 86 is provided with an internally threaded boss 109, into which is screwed a hollow plug 111, having a vent 112 in the side thereof. A spring 113 engages the closed end of the plug 111 and engages with a plate 114, which is secured to diaphragm 92, thus tending to bias stem 93 upwardly into engagement with valve member 96.

Operation of Figures 1 and 2

Referring first to the reversing valve means 26, assuming a 20 p. s. i. air supply through conduit 106, then with no pressure at conduit 81, adjusting screw or plug 111 is screwed down to adjust the spring 113 until the diaphragm or delivery pressure in conduit 44 is 20 p. s. i. The effective area of diaphragm 92 is twice that of diaphragm 91, as stated hereinbefore. If the area of diaphragm 91 is equal to $y$, the area of diaphragm 92 is equal to $2y$. If the instrument or control pressure at 81 is increased 1 p. s. i., there will be an increase in force on diaphragm 92 equal to $2y$ and an increase in force on diaphragm 91 equal to $y$. This leaves a net unbalanced downward force on the diaphragm assembly equal to $y$ and, consequently, the assembly will move, opening the bleed valve 96. This will allow air to escape from the chamber 104 until the pressure on the top of diaphragm 91 is reduced 1 p. s. i. The diaphragm assembly will again be in static balance, and the bleed valve 96 closed. Thus, it becomes apparent that with every pound increase at 81, one pound decrease will result at 44.

If there is a 1 p. s. i. decrease at 81, this will result in a 1 p. s. i. increase at 44, because the diaphragm assembly of the reversing valve means 26 will move upwardly, opening inlet valve 95 and permitting increase in pressure in chamber 104 and in conduit 44 until the pressures are again balanced, whereupon the inlet valve 95 is closed.

Referring now to the complete air circuit, starting with the air from the instrument or controller which enters through conduit 77, increasing air pressure will cause the bellows assembly 62, 63 to be moved to the left as viewed in Figure 2, which opens the air supply valve 72 allowing air supply pressure entering through conduits 107 and 76 to flow into the chamber formed by the two bellows 62, 63 and through conduit 81 into lower diaphragm chamber 42 of the motor 22. The same increase in pressure is also registered in chamber 87 of reversing valve means 26 which, as explained above, causes an unbalance in the relay diaphragm assembly and causes it to move downwardly allowing air to escape from chamber 104 through passage 94 and bleed outlet 112. This lowers the pressure in the chamber 41 of the motor 22 an amount equivalent to the rise in pressure in the chamber 42 of motor 22. There is now an unbalanced force on the main diaphragm assembly 31, 32 which causes the valve stem 23 to move upwardly. This supplies compression to the spring 57 through the levers 47, 48 and 49, which balances the increase in pressure on bellows assembly 62, 63, causing supply valve 72 to again close. This places the system again in balance. If, due to hysteresis in the diaphragm assembly 31, 32, sticking in the stuffing box 40 or unbalanced pressure forces on the valve or governor being operated, the valve stem 23 does not move immediately, air will continue to bleed through the inlet valve 72, consequently increasing air pressure in the chamber 42 and decreasing pressure in the chamber 41 until the valve stem 23 moves or until the pressure in chamber 42 has increased to the equivalent of the air supply, that is, 20 p. s. i., and the air pressure in chamber 41 has reached zero. This makes available for moving the valve stem 23 a force equivalent to the product of the diaphragm area 32, times the supply pressure. For example, if the diaphragm area is 100 square inches and the air supply is 20 p. s. i., there is a 2000 pound force available to move the valve stem 23.

Upon a decrease of pressure from the instrument or controller through conduit 77, the bellows assembly 62, 63 will move to the right as viewed in Figure 2. Since the inner valve 72 is seated at 73, it cannot move further to the right. Consequently, the left hand bellows head 67 breaks away from bleed valve 69, opening the bleed port 68 and allowing air to bleed from the chamber formed by the bellows 62, 63. This decreases the pressure in chamber 87 of reversing valve means 26 and in chamber 42 of the motor 22. The decrease in pressure in chamber 87 causes an increase in pressure in chamber 41 of motor 22, as explained above. The unbalance on the diaphragm assembly 31, 32 will now cause the valve stem 23 to move downwardly, which, through levers 47, 48 and 49, will decrease the loading on spring 57 until the spring load again balances the pressure load from the instrument or controller in the chamber formed by bellows 63 and cup member 61, thus closing bleed valve 69 and placing the system again in balance.

Description of Figure 3

Referring now to Figure 3 for a description of the second embodiment of the invention, it is first noted that the valve device 24 and the reversing valve means 26 are identical with that described with respect to Figures 1 and 2, except that they are inverted. Furthermore, the bellows assembly shown in Figure 2 is identical in Figure 3 as is the valve or governor to be operated. Where the parts are the same, the same numbers have been given in Figure 3 as in Figures 1 and 2. One of the advantages of the invention is that by merely inverting the valve device 24 and reversing valve means 26 and making the proper piping connections, the direction of operation of valve stem 23, upon increase and decrease in instrument or control pressure, may be reversed. In the embodiment shown in Figure 3, the principle of operation of the motor, which is given number 122, is the same as discussed with respect to Figures 1 and 2.

The motor 122 comprises an upper cup-shaped casing member 127, a lower cup-shaped casing member 128 and an intermediate annular casing member 129, having a wall 145 extending across the annular member 129 with an opening 130 centrally thereof. A diaphragm 131 of rubber or the like is clamped between the casing members 127, 129, and a similar diaphragm 132 is clamped between the casing members 128 and 129.

A reciprocating sleeve 133 surrounds a stem 123 within the casing 122, and is adapted to slide in opening 130 in the partition 145. The sleeve is secured at its upper end to a plate 134, which, with a plate 135 and nut 136, clamps the diaphragm 131 to the stem 123 and sleeve 133. The sleeve 133 is secured at its lower end to a plate 137, which, with a plate 138 and nut 139, secures the sleeve 133 and stems 23 and 123 to the lower diaphragm 132. A stuffing box 140 is provided in the lower casing member 128 for the valve stem 23.

There is thus formed in the motor 122 an upper air chamber 141 and a lower air chamber 142. A conduit 144 opens into the chamber 141 and communicates with conduit 45 and 81. Also formed within the casing 122 is a chamber 146 between diaphragm 131 and partition 145, and a chamber 147 between diaphragm 132 and partition 145.

A suitable plug 148 is provided in the top casing member 127, and a needle valve 149 is provided in casing member 129, which is also provided with passages 151 and 152 communicating with chambers 146 and 147, respectively, when valve 149 is open. The two chambers 146 and 147 are filled with a liquid having a relatively low freezing point, and the needle valve 149 restricts the passage between the chambers 146 and 147. The diaphragm spacer or sleeve 133 is a closely machined fit in the partition 145. In order for the diaphragm assembly 131, 132 to move, liquid must be displaced between chambers 146 and 147 through the passages 151 and 152. This gives the diaphragm assembly a high degree of stability, which may be controlled by the needle valve 149.

*Operation of Figure 3*

The operation of the device is exactly the same as that described with respect to Figures 1 and 2, except that upon an increase in instrument or control pressure in conduit 77, the valve stem 23 moves downwardly, while a decrease in instrument or control pressure causes the valve stem 23 to move upwardly.

From the foregoing, it will be apparent that I have provided a double diaphragm motor valve which is extremely powerful, and that the motor valve, in combination with a pneumatic reversing valve means, provides improved operation and affords a reversal of movement in a very simple manner.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a pneumatic system, the combination of a pneumatic motor for imparting reciprocating movement to a member, a valve device adapted to effect admission of fluid pressure to said motor and exhaust fluid pressure therefrom, a reversing valve means for said motor controlled by said valve device, said motor including a casing, two spaced diaphragms scanning the casing to form therewith a first chamber, a second chamber and an intermediate space between the diaphragms, means for securing said diaphragms together and to the member to be reciprocated, a supply of fluid under constant pressure, fluid connections between said constant pressure supply and said valve device and reversing valve means, a supply of fluid under variable pressure connected to said valve device, fluid connections to said first and second chambers, one of said last connections communicating with the reversing valve means and the other with said valve device, and movable valve members and passages in said reversing valve means and said valve device so arranged that an increase in said variable pressure fluid supply effects an increase of pressure in one of said chambers and a decrease in pressure in the other of said chambers, and vice versa when said variable pressure fluid supply decreases.

2. A pneumatic motor for imparting reciprocating movement to a member, said motor comprising a closed casing, said casing including an upper member, a lower member and an intermediate member, said intermediate member providing a partition, a first diaphragm extending across said casing above said partition and being clamped at its periphery between the upper and intermediate casing members, a second diaphragm extending across said casing below said partition and being clamped at its periphery between the lower and intermediate casing members, said diaphragms with the partition and casing forming four chambers, namely, an upper chamber above the first diaphragm, a lower chamber below the second diaphragm, a chamber between the first diaphragm and the partition, and a chamber between the second diaphragm and the partition, said chambers between the diaphragms and the partition being filled with liquid, a connecting passage between the chambers filled with liquid, and means for connecting said diaphragms together and to the member to be reciprocated, said connecting means including a sleeve surrounding said member to be reciprocated and extending through an opening disposed centrally of said partition, said sleeve being in contact with said member to be reciprocated adjacent the portion thereof which extends through said partition and also closely fitting the opening in said partition whereby any passage of fluid between the two chambers through said opening is substantially prevented.

3. A pneumatic motor for imparting reciprocating movement to a member, said motor comprising a closed casing, said casing including an upper member, a lower member and an intermediate member, said intermediate member providing a partition, a first diaphragm extending across said casing above said partition and being clamped at its periphery between the upper and intermediate casing members, a second diaphragm extending across said casing below said partition and being clamped at its periphery between the lower and intermediate casing members, said diaphragms with the partition and casing forming four chambers, namely, an upper chamber above the first diaphragm, a lower chamber below the second diaphragm, a chamber between the first diaphragm and the partition, and a chamber between the second diaphragm and the partition, said chambers between the diaphragms and the partition being filled with liquid, and means for connecting said diaphragms together and to the member to be reciprocated, a connecting passage between said third and fourth chambers extending through said partition and a restricting valve for controlling the flow of fluid between said chambers through said passage.

4. A pneumatic motor for imparting reciprocating movement to a member, said motor comprising a closed casing, said casing including an upper member, a lower member and an intermediate member, said intermediate member providing a partition, a first diaphragm extending across said casing above said partition and being clamped at its periphery between the upper and intermediate casing members, a second diaphragm extending across said casing below said partition and being clamped at its periphery between the lower and intermediate casing members, said diaphragms with the partition and casing forming four chambers, namely, an upper chamber above the first diaphragm, a lower chamber below the second diaphragm, a chamber between the first diaphragm and the patition, and a chamber between the second diaphragm and the partition, said chambers between the diaphragms and the partition being filled with liquid, means for connecting said diaphragms together and to the member to be reciprocated, said connecting means including a sleeve surrounding said member to be reciprocated and extending through an opening disposed centrally of said partition, said sleeve being in contact with said member to be reciprocated adjacent the portion thereof which extends through said partition and also closely fitting the opening in said partition whereby any passage of fluid between the two chambers through said opening is substantially prevented, a connecting passage between said third and fourth chambers extending through said partition, and a restricting valve for controlling the flow of fluid between said chambers through said passage.

5. In a pneumatic system, the combination of a pneumatic motor for imparting reciprocating movement to a member, a valve device adapted to effect admission of fluid pressure to said motor and exhaust fluid pressure therefrom, a reversing valve means for said motor controlled by said valve device, said motor including a casing, two spaced diaphragms spanning the casing to form therewith a first chamber, a second chamber and an intermediate space between the diaphragms, means for securing said diaphragms together and to the member to be reciprocated, a supply of fluid under constant pressure, fluid connections between said constant pressure supply and said valve device and reversing valve means, a supply of fluid under variable pressure connected to said valve device, fluid connections to said first and second chambers, one of said last connections communicating with the reversing valve means and the other with said valve device, and movable valve members and passages in said reversing valve means and said valve device so arranged that an increase in said variable pressure fluid supply effects an increase of pressure in one of said chambers and a decrease in pressure in the other of said chambers, and vice versa when said variable pressure fluid supply decreases, said diaphragms having substantially equal effective areas.

6. In a pneumatic system, the combination of a pneumatic motor for imparting reciprocating movement to a member, a valve device adapted to effect admission of fluid pressure to said motor and exhaust fluid pressure therefrom, a reversing valve means for said motor controlled by said valve device, said motor including a casing, two spaced diaphragms spanning the casing to form therewith a first chamber, a second chamber and an intermediate space between the diaphragms, a partition extending across the casing in the space between the diaphragms, means for controllably connecting the spaces formed between the diaphragms and the partition, means for securing said diaphragms together and to the member to be reciprocated, a supply of fluid under constant pressure, fluid connections between said constant pressure supply and said valve device and reversing valve means, a supply of fluid under variable pressure connected to said device, fluid connections to said first and second chambers, one of said last connections communicating with the reversing valve means and the other with said valve device, and movable valve members and passages in said reversing valve means and said valve device so arranged that an increase in said variable pressure fluid supply effects an increase of pressure in one of said chambers and a decrease in pressure in the other of said chambers, and vice versa when said variable pressure fluid supply decreases.

7. In a pneumatic system, the combination of a pneumatic motor for imparting reciprocated movement to a member, a valve device adapted to effect admission of fluid pressure to said motor and exhaust of fluid pressure therefrom, and a reversing valve means controlled by said valve device, for said motor, said motor including a casing, two spaced diaphragms spanning the casing to form therewith first and second chambers, a partition extending across the casing between said diaphragms, means extending through the partition for securing said diaphragms together and for imparting movement thereof to the member to be reciprocated, a supply of fluid under constant pressure, said constant pressure supply being connected to said valve device and to said reversing valve means, a supply of fluid under variable pressure connected to said valve device, fluid connections to said first and second chambers, one of said last connections communicating with the reversing valve means and the other with said valve device, said reversing valve means being effective to increase the pressure in one of said chambers when the pressure in the other decreases and to decrease the pressure in said one chamber when the pressure in the other increases, the space between both of said diaphragms and said partition being filled with liquid, a passage between said liquid filled chambers affording passage of liquid therebetween and a restricting valve in said passage to control the flow of liquid therethrough.

DONALD J. GAFFNEY.

REFERENCES CITED

The following references are of record in the file of this patent:

UNITED STATES PATENTS

| Number | Name | Date |
|---|---|---|
| 1,937,244 | Pelton | Nov. 28, 1933 |
| 2,092,019 | Randel | Sept. 7, 1937 |
| 2,372,345 | Temple | Mar. 27, 1945 |
| 2,376,671 | Dodson | May 22, 1945 |
| 2,382,941 | Moore | Aug. 14, 1945 |
| 2,400,048 | Jones | May 7, 1946 |

FOREIGN PATENTS

| Number | Country | Date |
|---|---|---|
| 14,235 | Germany | of 1881 |
| 3,058 | Great Britain | of 1884 |
| 644,689 | Germany | June 14, 1937 |